May 14, 1968     D. M. TENNISWOOD     3,382,676
MINIMUM TRAVEL HAND- OR FOOT-OPERATED POWER BRAKE ACTUATOR
Filed Aug. 8, 1966     3 Sheets-Sheet 1
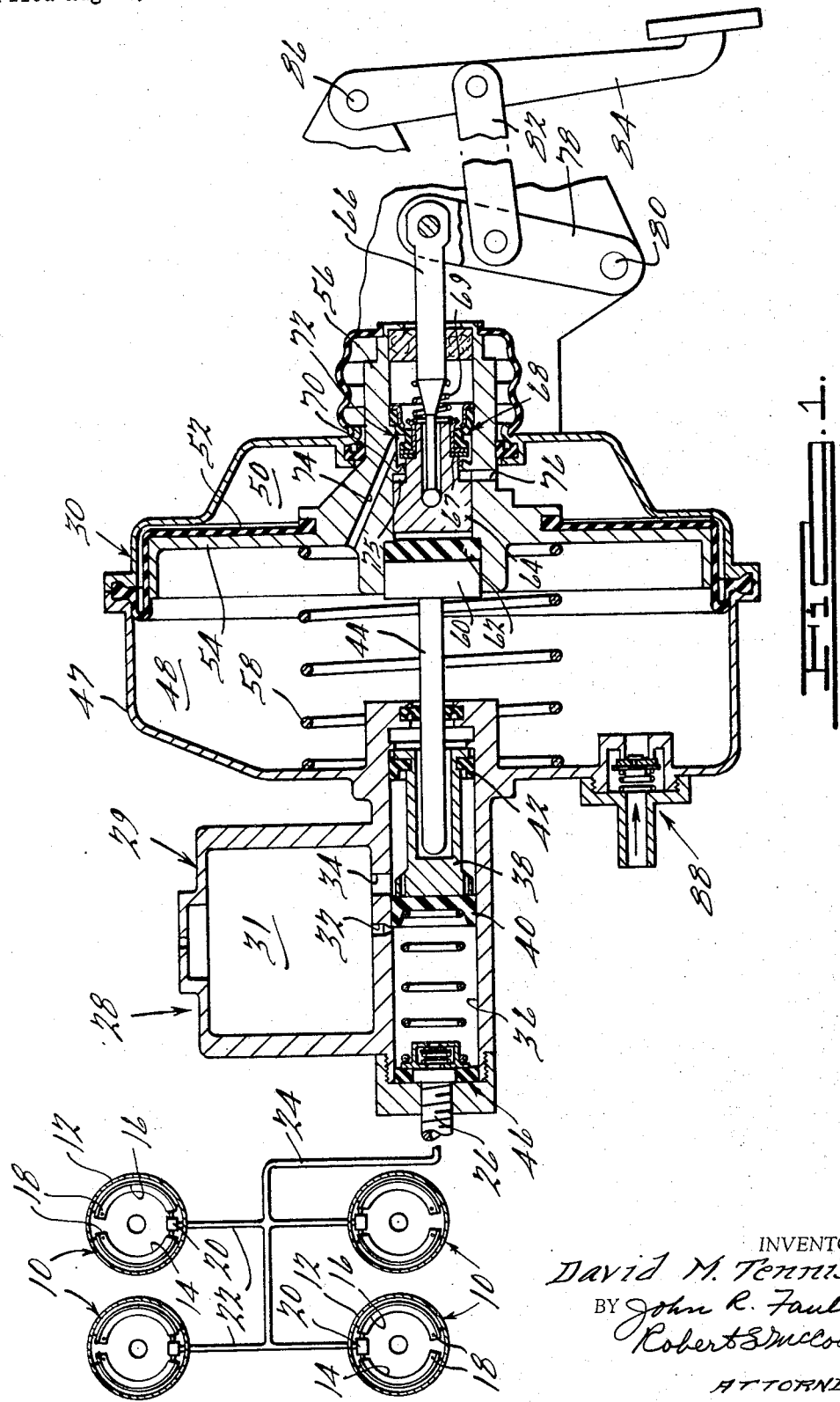
INVENTOR.
David M. Tenniswood
BY John R. Faulkner
Robert S. McCollum
ATTORNEYS.

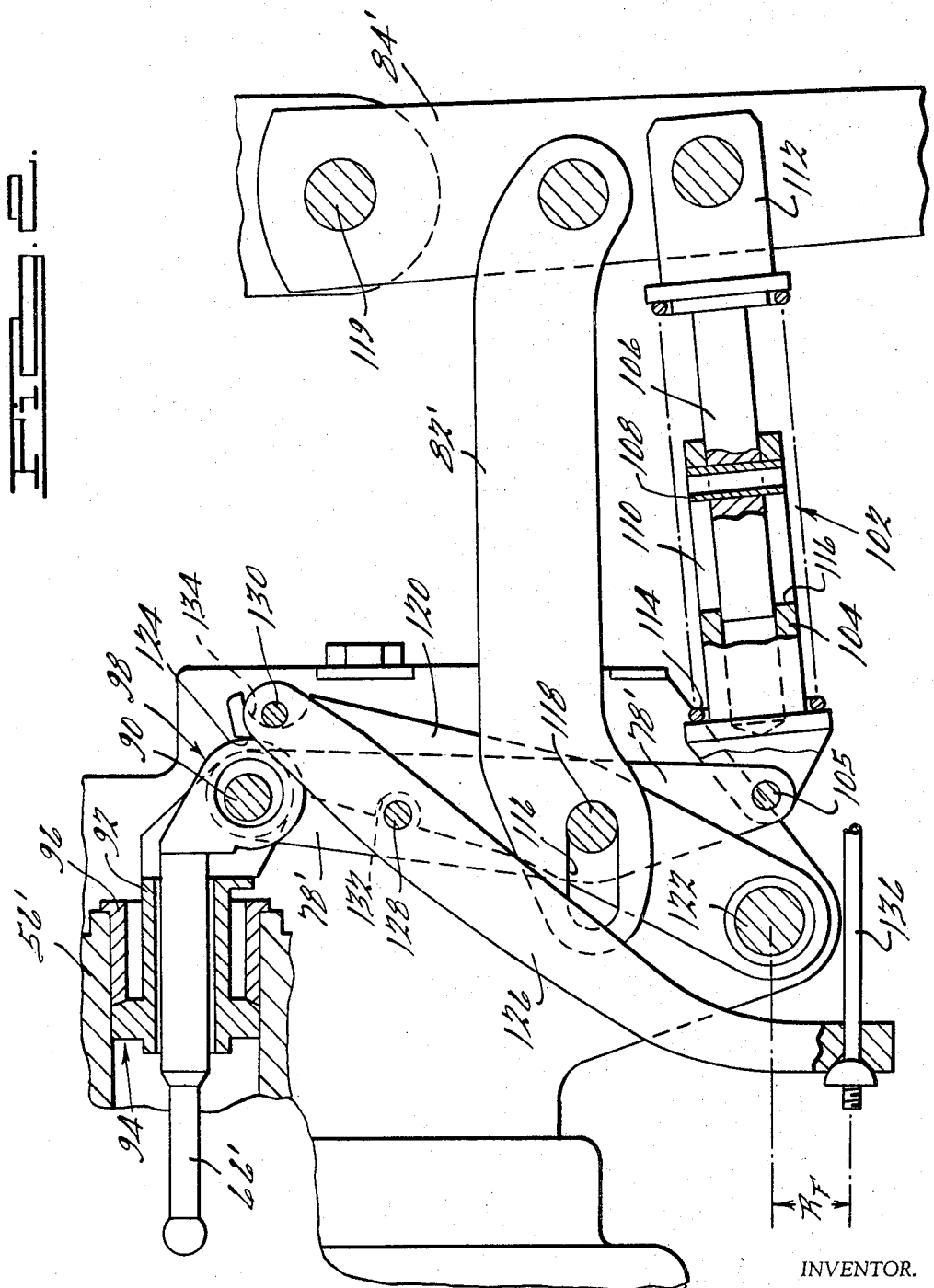

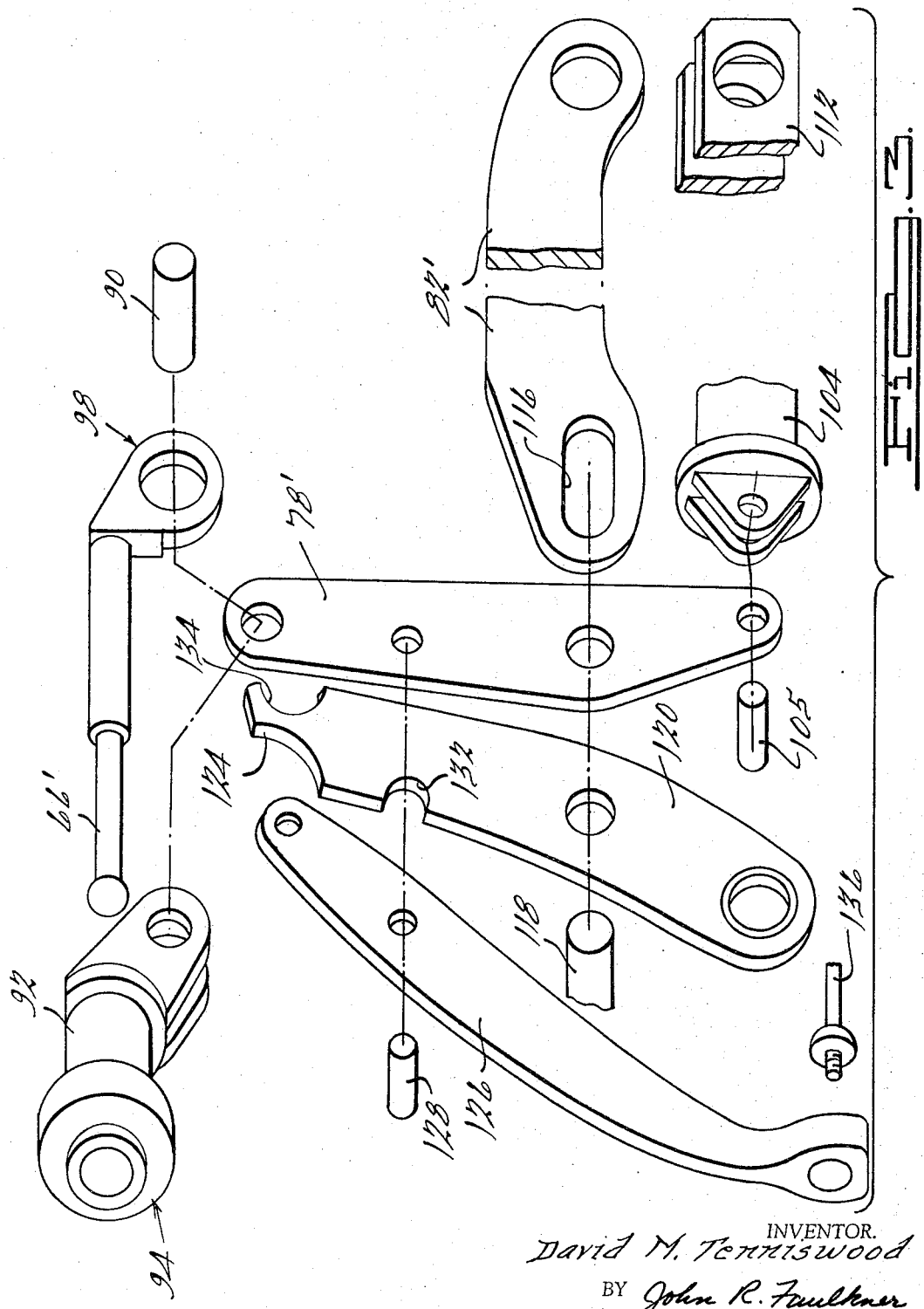

United States Patent Office 3,382,676
Patented May 14, 1968

3,382,676
MINIMUM TRAVEL HAND- OR FOOT-OPERATED POWER BRAKE ACTUATOR
David M. Tenniswood, Detroit, Mich., assignor to Ford Motor Company, Dearborn, Mich., a corporation of Delaware
Filed Aug. 8, 1966, Ser. No. 570,925
16 Claims. (Cl. 60—54.6)

This invention relates, in general, to a motor vehicle brake assembly. More particularly, it relates to a mechanical linkage for initiating operation of a motor vehicle power brake mechanism.

One of the primary objects of the invention is to provide a motor vehicle brake actuating linkage that can be controlled to provide as little or as much travel of the operator-moved brake control member as is desired.

Another object of the invention is to provide a motor vehicle brake actuating linkage that can be operated either by the conventional brake pedal, or by the fingers and hands of the vehicle operator.

A still further object of the invention is to provide a power brake actuator consisting of a mechanical linkage including tow arcuately swingable levers pivotally interconnected in such a manner that the operator need move one of the levers by only an extremely small amount to fully apply the brakes.

One of the disadvantages of conventional motor vehicle power booster brake systems is that the brake pedal usually must be depressed almost 40% of its total travel before the brakes are applied. The invention provides a brake actuating linkage that can be operated either by the hands of the vehicle operator or by the conventional brake pedal; and one that provides a full application of the brakes with just enough travel of the brake pedal or hand-operated control to move the pedal or control away from its rest position. The invention further provides means for varying the travel of the operator-controlled actuator, and means for applying the brakes in case of a power failure.

Other objects, features and advantages of the invention will become apparent upon reference to the succeeding, detailed description thereof, and to the drawings illustrating the preferred embodiments thereof; wherein, FIGURE 1 shows, schematically, a cross-sectional view of a known type of power brake system;

FIGURE 2 shows an enlarged cross-sectional view of a brake actuating linkage embodying the invention; and, FIGURE 3 shows an exploded view of the parts of FIGURE 2.

As stated previously, one of the primary objects of the invention is to provide an actuating linkage for a motor vehicle power brake system that causes a full application of the brakes almost simultaneously with activation of the system by the vehicle operator. The conventional power booster brake usually has a brake pedal connected mechanical linkage constructed such that in order to provide the desired mechanical advantage and low power feedback or reaction force, the brake pedal travel is sub-master cylinder operating rod to initiate operation of the power boost servo. For panic stops, the foot pedal travel necessary may be too long to prevent an accident. This is especially true when the conventionally mounted brake pedal is used to actuate the system, since the reaction time of the driver between seeing a danger and fully applying the brakes is approximately four seconds. The invention reduces the pedal travel required to a minimum.

FIGURE 1 shows the parts of a known type of power brake system. It includes a fluid pressure actuated mechanical friction brake 10 for each of the four wheels of a motor vehicle. The brakes per se are of a known construction, and include a drum 12 secured to the wheel and cooperating with a pair of arcuately movable primary and secondary brake shoes 14 and 16. The shoes are pivotally anchored at one end against stationary pins 18, and are biased inwardly at their opposite ends against the plunger ends of a wheel cylinder 20. The wheel cylinders are actuated by fluid under pressure supplied to branch lines 22 from a line 24 connected to a high pressure master cylinder outlet port 26.

The master cylinder assembly 28 includes a conventional master cylinder unit 29 and a vacuum differential operated servo unit 30. Unit 29 includes the usual brake fluid reservoir 31 communicating fluid through a compensating port 32 and an inlet 34 to the master cylinder bore 36 and port 26. The bore slidably contains a piston 38 having primary and secondary one-way cup seals 40 and 42, the piston being spring biased against the end of a master cylinder push rod 44. The bore also contains a residual pressure one-way check valve 46.

Push rod 44 extends sealingly through one side of the servo unit housing 47. The housing has two internal fluid chambers 48 and 50 defined by an annular diaphragm 52 joined to the housing and to a power piston 54. The power piston has a sleeve extension 56 slidable through the opposite housing side, and is biased to the position shown by a spring 58. The left-hand side of piston 54 is recessed to slidably receive the plunger end 60 of rod 44, which acts against a rubber reaction disc 62.

The right-hand piston portion slidably receives a valve plunger 64 secured to a valve operating rod 66. The right edge 67 of plunger 64 cooperates at times with an annular rubber-like sequencing valve 68. The valve is fixed at one edge to the piston sleeve extension 56, and is biased to the left by a spring 69. When plunger 64 is moved to the left, the left edge of valve 68 seats against a shoulder 70 on the piston body to define a closed annular chamber 72. Chamber 72 connects with servo chamber 48 by a passage 74. The outer annular space 75 between plunger 64 and piston 54 is connected by a control passage 76 to servo chamber 50.

Valve operating rod 66 is pivotally secured to the upper end of a lever 78 arcuately swingable about a fixed pivot pin 80. Near its median point, it is pivotally connected to a link 82 pivotally secured at its other end to a conventional brake pedal lever 84. Lever 84 in turn is pivotally connected at its upper end 86 to a stationary portion of the vehicle body.

In operation, with the brake released, the parts are as shown, the sequencing valve 68 seating against its plunger 64. Vacuum admitted to servo chamber 48 through a check valve 88 passes through passages 74, 75 and 76 to chamber 50 to balance the fluid pressure on opposite sides of piston 54. In applying the brakes, leftward movement of the brake pedal lever 84 and link 82 causes substantially an equal travel of valve operating rod 66 and plunger 64 to initially seat sequencing valve against piston shoulder 67. This closes chamber 72. Continued leftward movement of rod 66 separates plunger 64 and sequencing valve 68 to admit atmospheric air from the open end of sleeve 56 to control passage 76, and, therefore, to the right-hand servo chamber 50. This causes a movement of power piston 54 to the left to actuate the master cylinder piston 38 to the left to apply the brakes. The degree of movement will of course depend upon the modulated movement of plunger 64 by pedal lever 84. As the power piston moves, the plunger 64 and rod 66 also continue to move, causing further travel of brake pedal lever 84.

As the fluid pressure in the brake line 24 builds up, the reaction force acts on the reaction disc 62. The larger portion of this force acts against power piston 54, the smaller area opposite plunger 64 transmitting a small feedback force through the linkage and brake pedal to the driver. When the reaction force against the brake pedal equals the foot effort of the driver, the power piston 54 will stop moving. Release of the foot pedal will of course cause a reverse operation to return thhe parts to the positions shown.

The above is a known construction and operation, and further details are therefore not given. It will be clear, therefore, that with the known type of actuating linkage, the brake pedal lever 84 must travel substantially the same linear distance as is required of the valve plunger 64 before and while the power piston 54 moves to apply the brakes.

Turning to the invention, FIGURES 2 and 3 show a mechanical linkage that permits the vehicle brakes to be applied by only a fractional movement of the fingers of the vehicle operator, or by depression of a foot-operated brake pedal, or by both. More specifically, a foot pedal movable link or lever 78' is pivotally secured at its upper end by a pin 90 to a sleeve 92. The sleeve has a number of spaced fingers 94 that abut the edge of a sleeve insert 96 bonded or otherwise fixed to the power piston sleeve extension 56'. The valve operating rod 66' extends slidably through sleeve 92 and is pivotally mounted on pin 90 of lever 78' by lost motion means consisting of an enlarged eyelet 98.

The lower end of lever 78' is pivotally connected to brake pedal lever 84' by a resilient, spring-loaded, push-pull link 102. The link moves essentially linearly, and consists of a hollow housing 104 pivotally connected by a pin 105 to lever 78', a stem 106 telescopically movable in housing 104, a travel limit pin 108 fixed to stem 106 and slidable in slots 110 in housing 104, an enlarged end 112 pivotally connected to pedal 84', and a compressible spring 114 seated between housing 104 and head 112 to bias the two apart. The spring desirably is preloaded to a value such that there is no compression of the spring during brake actuating movement of pedal 84' until vacuum runout of the brake servo is reached, or until there is a failure in the brake system, as will be explained more fully later.

The lower central portion of lever 78' is pivotally connected to a link 82' by a pin 116 fixed to lever 78' and projecting through an elongated slot 118 in link 82'. The link constitutes a power failure or fail-safe brake actuator, and is pivotally connected to brake pedal 84'. The length of slot 116 is slightly shorter than the length of resilient link slots 110 to permit normal operation of the linkage by movement of pedal 84' and link 102 without interference by link 82', in a manner that will become more apparent later.

A second arcuately movable lever 120 is pivotally mounted at its lower end about a stationary pivot pin 122 that is attached to the frame of the motor vehicle or projects from a portion of the brake housing. The lever also is pivotally mounted on pin 118 so that the two levers 78' and 120 are pivotally interconnected. At its upper end, lever 120 is formed with an inner arcuate surface 124 that abuts the rod portion defined by eyelet 98.

The linkage also includes a third lever 126 that may be used for actuating the brake linkage by means of the fingers or hands of a vehicle operator. Lever 126 is pivotally connected to both levers 78' and 120 by pins 128 and 130, respectively, lever 120 having suitable cutouts 132 and 134 to accommodate arcuate relative movements of the three levers without interference. Lever 126 extends downwardly to a point below and, in this particular case, to the left of the fixed pivot 122 for connection with a substantially linearly movable finger actuated rod 136.

Rod 136 would be connected in any suitable manner to a point in the vehicle driver compartment accessible to the fingers or hands of the driver. For example, the rod could be connected to an actuating mechanism installed on the steering wheel of the vehicle, or on the steering column adjacent the steering wheel, or on the dashboard.

In operation, the linkage has a scissors-like action. Leftward movement of the brake pedal and resilient link 102 to apply the brakes applies a leftward force to the lower end of lever 78' and attempts to rotate the lever clockwise about pivot pin 118. At the same time, the brake pedal force attempts to rotate the two levers 78' and 120 about the stationary pivot pin 122. Since fingers 94 of sleeve 92 are prevented from rightward movement by sleeve insert 96 secured to valve housing 56', the upper end of lever 78', and particularly pin 90, now acts as a secondary fulcrum to permit clockwise rotation of lever 78'. This results in a leftward arcuate swinging movement of lever 120 and the lower portion of lever 78' as pin 118 moves leftwardly, thus causing a leftward movement of rod 66' without movement of sleeve 92 until the clearance between pivot pin 90 and eyelet 98 is taken up.

The travel permitted by the clearance is sufficient to cause rod 66' to actuate the vacuum servo motor, which immediately then causes a leftward movement of the valve housing 56' and pulls sleeve 94 and lever 78' with it. Because of the interconnection by pivot pin 118, both levers 78' and 120 then pivot counterclockwise about stationary pivot pin 122, and the brakes are applied. At this time, the power failure link 82' plays no part in the operation, the pin 118 merely moving leftwardly in the slot 116.

If a failure should occur in the power system, or vacuum run-out occur, continued depression of brake pedal 84' by the vehicle operator, or initial depression of the pedal by the operator, will immediately cause the leftward force to be applied through link 82' to pin 118. This pivots both levers 120 and 78' about stationary pivot 122 to move actuating rod 66' the desired amount to mechanically actuate the brake master cylinder piston. This action is permitted by the spring-loaded link 102 collapsing or contracting when the preload of the spring is overcome by the effort applied through the brake pedal and link 82'.

From the consideration of the drawing, it will be seen that the pin 105 pivotally connecting the lower portion of lever 78' to resilient link 102 will move arcuately a small distance around pivot pin 122 as the linkage is actuated. Accordingly, the lateral or linear travel of brake pedal 84' and link 102 is minimal, and just sufficient to take up the clearance between upper pivot pin 90 and the clearance between it and the eyelet 98 extension of rod 66'. It will be clear, therefore, that the amount of linear travel of link 102, and, therefore, the amount of depression of the brake pedal required by the vehicle driver, will be determined by the position or location of pivot pin 105 relative to stationary pivot 122. If the location of pin 105 is shifted so as to be below the pivot pin 122, the line of application of force through link 102 causing a clockwise movement of pin 105 would actually cause the brake pedal to rise during brake application. Conversely, if the pin 105 were located above pivot pin 122, the pedal will travel further to the left upon application of the brake. Therefore, it can be seen that any desired amount of travel can be obtained simply by moving the pin either up or down relative to the pin 122.

Also, if pivot pin 118 connecting the two levers 78' and 120 were to be moved up from the location shown, the mechanical disadvantage of the scissors becomes less thereby decreasing the foot pedal effort required to actuate the brakes. Conversely, the pin 118 can be moved down to increase the pedal efforts; in either case, however, without affecting the travel of the pedal, which is strictly a function of the relative rotation between pins 122 and 105. Therefore, it will be seen that the pedal effort and pedal travel can be varied independent of one another.

The above describes the operation during depression of the conventional brake pedal. If it is desired to actuate the brake by means of the remote control actuator located adjacent the fingers or hands of the vehicle operator, actuation of this control will cause a rightward movement of rod 136. This causes a counterclockwise rotation of lever 126 about pivot pin 128 to apply a leftward force to lever 120 in substantially the same manner as described in connection with operation of this lever by brake pedal 84'. Since upper pivot pin 90 temporarily remains stationary, serving as a reaction member, lever 120 will move leftwardly relative to pin 90 and thereby move rod 66' to actuate the servo in the same manner as described for a normal foot-operated brake apply operation.

The travel of rod 136, of course, is controlled simply by changing the radial distance (R) from pin 122 to the line of force applied through rod 136 to lever 126. That is, by positioning the point of connection of rod 136 to lever 126 horizontally in line with the pivot pin 122 ($R=0$), the amount of lateral or horizontal travel of rod 136 necessary to cause a movement of plunger 66' sufficient to initiate movement of piston 54 would be substantially zero; that is, just enough to move the rod 136 from its rest position. If connected in this manner, the two levers 120 and 126 would have substantially instantaneous centers about which the two levers pivot during movement of servo 54, resulting in an extremely small travel of rod 136.

It is to be noted, therefore, that the travel of the finger actuated rod 104 will be proportional to the distance of the connection of rod 136 to lever 126 from the pivot pin 122, and, that the travel can be adjusted independently of the feel or feedback force on the fingers. Also, the feedback force can be adjusted as desired simply by varying the location of the pin 128.

From the foregoing, therefore, it will be seen that the invention provides a mechanical linkage for actuating a power booster brake assembly in which the linear movement of the operator actuated mechanism is extremely small and controllable to the degree desired to provide full braking, in one case, with substantially very little finger movement, and in another case, with very little travel of the conventional brake pedal. Also, the reaction or feedback force can be adjusted independently of the travel.

While the invention has been illustrated in its preferred embodiment in the figures, it will be clear to those skilled in the arts to which the invention pertains that many changes and modifications may be made thereto without departing from the scope of the invention.

I claim:

1. A force transmitting linkage comprising, means to be actuated, a first lever mounted for an arcuate movement about a fixed pivot at one end, a second lever having a pivotal connection to said first lever at a point spaced from said fixed pivot, means between adjacent ends of said levers operably interconnecting said levers and the means to be actuated permitting a limited arcuate movement of said first lever in one direction relative to said second lever to actuate said means to be acuated, and substantially linear movable actuating means connected to said second lever adjacent said fixed pivot for moving said levers to provide said relative movement, the linear travel of said actuating means varying as a function of the distance of the line of application of force to said second lever from said fixed pivot.

2. A force transmitting linkage as in claim 1, said first-mentioned means comprising a pin and slot type lost motion means, said pin being secured to said second lever and received in an enlarged slot in said means to be actuated thereby permitting relative movement therebetween, said first lever having means abuttable against said means to be actuated upon movement of said levers by said actuating means, and means initially operable to hold said pin stationary to effect movement of said means to be actuated by said first lever upon movement of said levers.

3. A force transmitting linkage as in claim 1, including a pivotally mounted pedal secured to said actuating means.

4. A force transmitting linkage as in claim 1, including a third lever pivotally connected at spaced points to said first and second levers, and manually actuated actuator means connected to said third lever adjacent said fixed pivot whereby movement of said manually actuated actuator means in one direction pivots said first and second levers to effect the limited arcuate movement of said second lever relative to said first lever to actuate said rod and servo.

5. A force transmitting linkage as in claim 4, said manually actuated actuator means being actuatable by the fingers or hands of a motor vehicle operator.

6. A force transmitting linkage as in claim 5, the line of force applied to said manually actuated actuator means by said third lever passing essentially through or slightly below the axis of said fixed pivot.

7. A brake actuating mechanism for a power boost brake assembly having a master cylinder piston movable by an operating rod operably connected thereto, a fluid pressure differentially operated servo mechanism operably connected to and between said piston and rod having control means rendered operable upon initial movement of said rod in one direction to move said piston independently of said rod, comprising, a mechanical linkage including a first lever arcuately movable about a fixed pivot at one end and abutting said rod, a manually movable second lever having a fixed pivotal connection to said first lever and a lost motion connection to said rod, said lost motion connection permitting a limited arcuate relative movement between end portions of said levers, substantially linear movable force means for moving said manually movable lever, and means operatively connecting said second lever to said control means for movement of said levers and rod by said control means subsequent to movement of said rod and first lever relative to said second lever sufficient to render inoperable said lost motion connection.

8. A brake actuating mechanism as in claim 7, wherein the force applied to said second lever acts along a line passing essentially through the axis of said first lever fixed pivot.

9. A brake actuating mechanism as in claim 7, wherein the application of force to said second lever is made at a point adjacent said fixed pivot providing substantially instantaneous centers for said levers for the substantially concurrent pivotal movement of said levers thereabout, thereby minimizing the linear travel of said linear movable means.

10. An operating mechanism for use in a fluid pressure actuated brake assembly having a master cylinder operating rod movable to apply fluid under pressure to said brake, and power booster servo means operatively connected between said master cylinder and said operating rod for power actuation of said brake upon a predetermined movement of said rod, comprising, a first lever arcuately swingable about a fixed pivot at one end, a second arcuately swingable lever pivotally connected to said first lever at a point spaced from said fixed pivot, lost motion means operably connecting said second lever and rod, said first lever having means abutting said rod, means operably connecting said servo means and said second lever, and manually operated means for applying a force to said second lever to initially move said rod to actuate said servo means whereby said levers and rod are moved thereby, application of force by said manually operated means occurring at a point on said second lever adjacent the said first lever fixed pivot thereby minimizing travel of said manually operated means.

11. An actuating mechanism for a power operated brake assembly having a hydraulic master cylinder, a fluid pressure differentially operated servo and a manually operated operating rod connected in series to said master cylinder, comprising, a sleeve slidable with respect to and concentrically mounted on said operating rod, means operably connecting said sleeve to said servo for movement of said sleeve in one direction by said servo upon operation of said servo while preventing movement in the opposite direction, lost motion means connecting said sleeve and rod, a first lever pivotally fixed near one end to said sleeve, a manually operated actuating means, resilient push-pull force means pivotally connected at one end to said actuating means and at its opposite end to the opposite end of said first lever, a second lever pivotally swingable about a fixed pivot at one end and pivotally connected to said first lever and operably connected to said rod, said second lever fixed pivot being adjacent said first lever pivotal connection to said resilient means, movement of said manually operated actuating means moving said first and second lever and effecting an initial arcuate movement of said rod relative to said first lever and sleeve by said second lever, and means responsive to the initial movement of said rod for actuating said servo and thereby move said sleeve and levers about said fixed pivot, the location of said first lever adjacent said fixed pivot providing substantially instantaneous centers for the concurrent pivotal movement of said levers thereabout by said servo whereby the linear travel of said linear movable means is minimized.

12. An operating mechanism as in claim 10, the line of force applied to said second lever passing essentially between the pivotal interconnecting axis and said fixed pivot axis.

13. An actuating mechanism as in claim 11, said resilient means comprising tlscopically movabl portions connected respectively to said actuating means and said first lever, and spring means biasing said portions apart.

14. An actuating mechanism as in claim 11, including a link pivotally connected to said actuating means and having a lost motion pivotal connection to the pivotal connection between said levers, said latter lost motion connection permitting alternate actuation of said levers and rod by said actuating means through said resilient means or through said link.

15. An actuating mechanism as in claim 11, said lost motion connection pivot pin means pivotally connecting said sleeve and first lever, said rod having an aperture of larger diameter than said pin receiving said pivot pin therethrough for pivotal and radial movement of said rod relative thereto.

16. An actuating mechanism as in claim 11, said levers being pivotally interconnected at a point between their ends and spaced from the said fixed pivot.

References Cited

UNITED STATES PATENTS

| | | | |
|---|---|---|---|
| 2,805,550 | 9/1957 | Ayers | 60—54.6 |
| 2,896,585 | 7/1959 | Ingres | 91—377 |
| 2,896,586 | 7/1959 | Ayers | 91—377 |

MARTIN P. SCHWADRON, *Primary Examiner.*

R. R. BUNEVICH, *Assistant Examiner.*